(12) United States Patent  
Jung et al.

(10) Patent No.: US 12,255,020 B2  
(45) Date of Patent: Mar. 18, 2025

(54) CERAMIC ELECTRONIC COMPONENT (71) Applicant: SAMSUNG ELECTRO-MECHANICS CO., LTD., Suwon-si (KR)

(72) Inventors: Han Seong Jung, Suwon-si (KR); Ga Young An, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/747,666

(22) Filed: May 18, 2022

(65) Prior Publication Data

US 2023/0230767 A1  Jul. 20, 2023

(30) Foreign Application Priority Data

Jan. 20, 2022 (KR) .................. 10-2022-0008650

(51) Int. Cl.
  *H01G 4/12* (2006.01)
  *H01G 4/232* (2006.01)
  *H01G 4/248* (2006.01)
  *H01G 4/30* (2006.01)

(52) U.S. Cl.
  CPC ......... *H01G 4/1227* (2013.01); *H01G 4/2325* (2013.01); *H01G 4/248* (2013.01); *H01G 4/30* (2013.01)

(58) Field of Classification Search
  None
  See application file for complete search history.

(56) References Cited

U.S. PATENT DOCUMENTS

| | | | |
|---|---|---|---|
| 5,183,631 A * | 2/1993 | Kugimiya | C04B 35/74 419/45 |
| 9,928,959 B2 * | 3/2018 | Yoon | H01G 4/1218 |
| 10,510,491 B1 * | 12/2019 | Kwon | H01G 4/129 |
| 2001/0046603 A1 * | 11/2001 | Constantino | C09C 3/063 524/413 |
| 2005/0088803 A1 * | 4/2005 | Umeda | C04B 35/6303 361/321.2 |
| 2006/0087796 A1 * | 4/2006 | Yamazaki | C04B 35/4682 361/321.2 |
| 2008/0068777 A1 * | 3/2008 | Takeoka | C04B 35/4682 361/321.4 |
| 2013/0027843 A1 * | 1/2013 | Seo | H01G 4/12 361/321.2 |

(Continued)

FOREIGN PATENT DOCUMENTS

| KR | 10-2005-0039654 A | 4/2005 |
|---|---|---|
| KR | 10-2021-0063238 A | 6/2021 |
| KR | 10-2021-0074678 A | 6/2021 |

*Primary Examiner* — Dion R. Ferguson  
(74) *Attorney, Agent, or Firm* — MORGAN, LEWIS & BOCKIUS LLP (57) ABSTRACT

A ceramic electronic component includes: a body including dielectric layers and internal electrodes; and external electrodes disposed on the body and connected to the internal electrodes, in which the dielectric layers include a plurality of dielectric crystal grains, an average number of dielectric crystal grains per unit thickness (1 μm) of the dielectric layers is 6 or more, and td is 2.0 μm or less, td being an average thickness of at least one of the dielectric layers.

16 Claims, 4 Drawing Sheets

(56) References Cited

U.S. PATENT DOCUMENTS

| | | | | |
|---|---|---|---|---|
| 2015/0221437 A1* | 8/2015 | Yoon | ............... | H01G 4/1209 |
| | | | | 156/89.12 |
| 2019/0100465 A1* | 4/2019 | Yoon | ............... | B32B 18/00 |
| 2019/0135701 A1* | 5/2019 | Yun | ............... | C04B 35/49 |
| 2020/0411241 A1* | 12/2020 | Hashimoto | ............... | H01G 4/0085 |
| 2021/0090800 A1* | 3/2021 | Park | ............... | H01B 3/10 |
| 2021/0159014 A1 | 5/2021 | Kowase | | |
| 2021/0183572 A1 | 6/2021 | Kim et al. | | |
| 2021/0366653 A1* | 11/2021 | Oh | ............... | H01G 4/0085 |

* cited by examiner

CERAMIC ELECTRONIC COMPONENT

CROSS-REFERENCE TO RELATED APPLICATION(S)

This application claims the benefit of priority to Korean Patent Application No. 10-2022-0008650 filed on Jan. 20, 2022 in the Korean Intellectual Property Office, the disclosure of which is incorporated herein by reference in its entirety.

TECHNICAL FIELD

The present disclosure relates to a ceramic electronic component.

BACKGROUND

A multilayer ceramic capacitor (MLCC), a ceramic electronic component, is a chip-type capacitor mounted on a printed circuit board of several electronic products such as an image device, for example, a liquid crystal display (LCD) or a plasma display panel (PDP), a computer, a smartphone, a mobile phone, and the like, to serve to charge or discharge electricity therein or therefrom.

Such a multilayer ceramic capacitor may be used as a component of various electronic apparatuses since it has a small size, implements a high capacitance, and may be easily mounted. Recently, in accordance with miniaturization and an increase in output of various electronic apparatuses such as computers and mobile devices, a demand for miniaturization and a capacitance increase of the multilayer ceramic capacitor has increased.

In addition, recently, in accordance with an increase of an interest in electronic components for a vehicle in the industry, the multilayer ceramic capacitor has also been required to have a high reliability characteristic in order to be used in the vehicle or an infotainment system.

In order to achieve the capacitance increase of the multilayer ceramic capacitor, the number of stacked dielectric layers needs to be increased by decreasing the thickness of the dielectric layer. However, as the thickness of the dielectric layer decreases, an electrical field applied to a dielectric at the same operating voltage increases. Therefore, it is essential to secure reliability of the dielectric.

SUMMARY

An aspect of the present disclosure may provide a ceramic electronic component having excellent reliability.

Another aspect of the present disclosure may provide a ceramic electronic component having increased capacitance per unit volume.

According to an aspect of the present disclosure, a ceramic electronic component may include: a body including dielectric layers and internal electrodes; and external electrodes disposed on the body and connected to the internal electrodes, in which the dielectric layers include a plurality of dielectric crystal grains, an average number of dielectric crystal grains per unit thickness (1 μm) of the dielectric layers is 6 or more, and td is 2.0 μm or less, td being an average thickness of at least one of the dielectric layers.

According to another aspect of the present disclosure, a ceramic electronic component may include: a body including dielectric layers and internal electrodes; and external electrodes disposed on the body and connected to the internal electrodes, in which the dielectric layers include a plurality of dielectric crystal grains, an average grain size of the plurality of dielectric crystal grains is 166 nm or less, and td is 2.0 μm or less, td being an average thickness of at least one of the dielectric layers.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

In the drawings, a first direction may refer to a stacking direction or a thickness T direction, a second direction may refer to a length L direction, and a third direction may refer to a width W direction.

Ceramic Electronic Component

Figure 1:
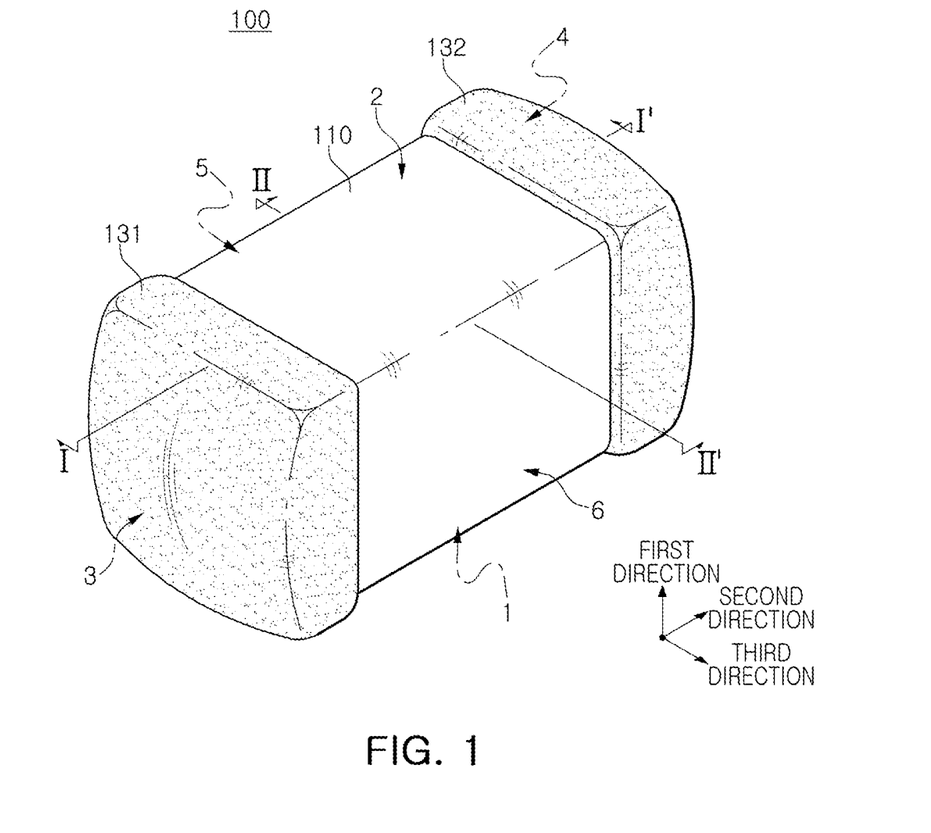
FIG. 1 is a schematic perspective view illustrating a ceramic electronic component according to an exemplary embodiment in the present disclosure.

FIG. 1 is a schematic perspective view illustrating a ceramic electronic component according to an exemplary embodiment in the present disclosure.

Figure 2:
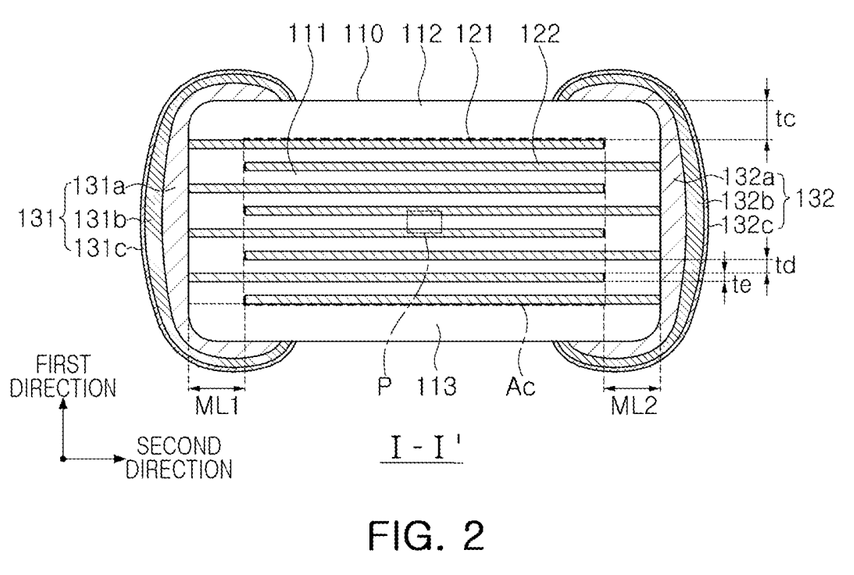
FIG. 2 is a schematic cross-sectional view taken along line I-I' of FIG. 1.

FIG. 2 is a schematic cross-sectional view taken along line I-I' of FIG. 1.

Figure 3:
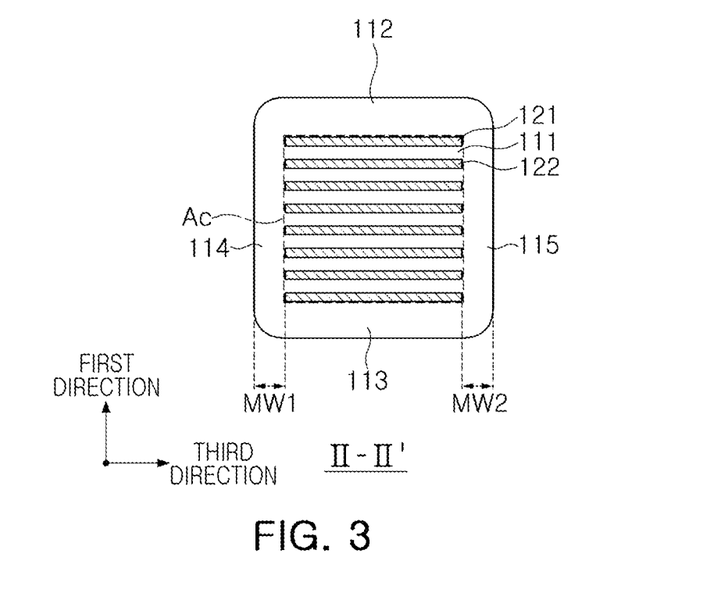
FIG. 3 is a schematic cross-sectional view taken along line II-II' of FIG. 1.

FIG. 3 is a schematic cross-sectional view taken along line II-II' of FIG. 1.

Figure 4:
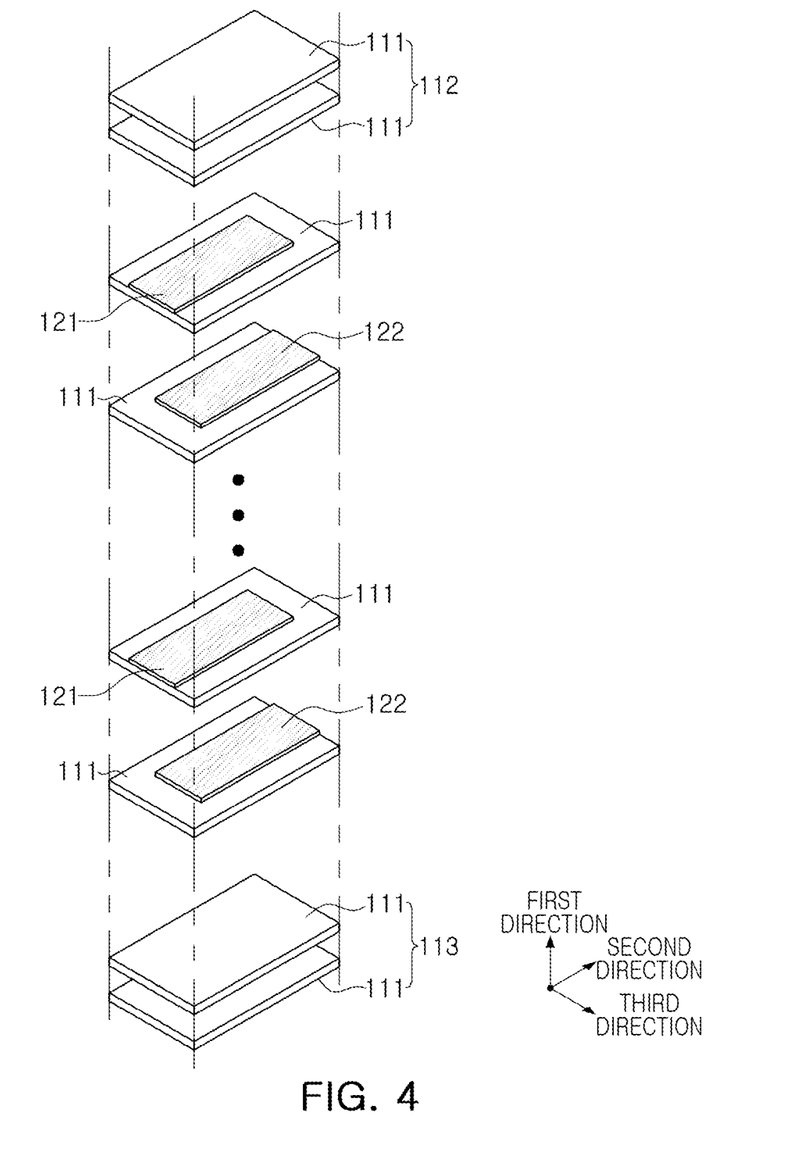
FIG. 4 is a schematic exploded perspective view illustrating a body of the ceramic electronic component according to an exemplary embodiment in the present disclosure.

FIG. 4 is a schematic exploded perspective view illustrating a body of the ceramic electronic component according to an exemplary embodiment in the present disclosure.

Figure 5:
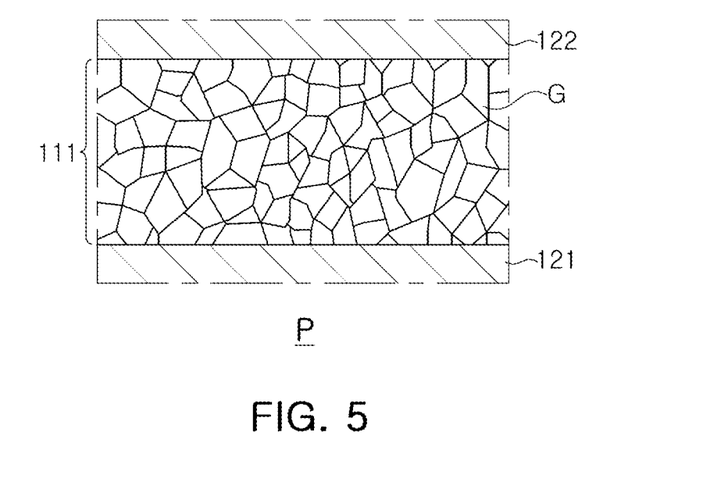
FIG. 5 is an enlarged view of region P of FIG. 2.

FIG. 5 is an enlarged view of region P of FIG. 2.

Hereinafter, a ceramic electronic component 100 according to an exemplary embodiment in the present disclosure will be described in detail with reference to FIGS. 1 through 5. In addition, a multilayer ceramic capacitor (hereinafter, referred to as an "MLCC") will be described as an example of the ceramic electronic component, but the present disclosure is not limited thereto, and may also be applied to various ceramic electronic components using a ceramic material, such as an inductor, a piezoelectric element, a varistor, or a thermistor.

A ceramic electronic component 100 according to an exemplary embodiment in the present disclosure may include: a body 110 including dielectric layers 111 and internal electrodes 121 and 122; and external electrodes 131 and 132 disposed on the body and connected to the internal electrodes, in which the dielectric layer 111 includes a plurality of dielectric crystal grains G, the number of dielectric crystal grains per unit thickness (1 μm) of the dielectric layer 111 is 6 or more, and td is 2.0 μm or less, td being an average thickness of the dielectric layer.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powder included in the body 110 at the time of sintering, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM). The number of stacked dielectric layers does not need to be particularly limited, and may be determined in consideration of a size of the ceramic electronic component. For example, the body may be formed by stacking 300 or more dielectric layers.

The dielectric layer 111 may include a plurality of dielectric crystal grains G, the number of dielectric crystal grains per unit thickness (1 μm) of the dielectric layer 111 may be 6 or more, and td may be 2.0 μm or less, td being an average thickness of the dielectric layer.

A multilayer ceramic capacitor (MLCC), one of the ceramic electronic components, tends to have high capacitance and a decreased thickness. However, as the thickness of the dielectric layer decreases, an electrical field (V/μm) applied to a dielectric at the same operating voltage increases. Therefore, it is essential to secure reliability of the dielectric. In addition, since a multilayer capacitor used in an electronic component for a vehicle requires a higher level of reliability, it may be difficult to secure high reliability by simply decreasing the thickness of the dielectric layer.

In order to increase the capacitance at the same rated voltage, the number of crystal grains per dielectric layer should be the same and the thickness of the dielectric layer should be decreased. Accordingly, the number of dielectric crystal grains per unit thickness of the dielectric layer should be increased. According to the present disclosure, the average thickness of the dielectric layer 111 may be decreased to 2.0 μm or less, and the number of dielectric crystal grains per unit thickness (1 μm) of the dielectric layer 111 may be controlled to 6 or more, thereby increasing capacitance per unit volume. As a result, high capacitance per unit volume may be implemented and excellent reliability may be secured.

In a case where the average thickness of the dielectric layer 111 exceeds 2.0 μm or the number of dielectric crystal grains per unit thickness (1 μm) of the dielectric layer 111 is less than 6, there is a possibility that the reliability deteriorates or the capacitance per unit volume decreases.

The average thickness td of the dielectric layer 111 may refer to an average thickness of the dielectric layer 111 disposed between the first and second internal electrodes 121 and 122.

The average thickness td of the dielectric layer 111 may be measured from an image obtained by scanning a cross section of the body 110 in the length and thickness directions (L-T) with a scanning electron microscope (SEM) of 10,000 magnifications. More specifically, an average value may be obtained by measuring thicknesses of one dielectric layer at 30 points positioned at equal intervals in the length direction in the obtained image. The 30 points positioned at equal intervals may be designated in a capacitance forming portion Ac. In addition, when an average thickness of a plurality of dielectric layers (e.g., 10 dielectric layers) is measured, the average thickness of the dielectric layers may further be generalized. Other measurement methods and/or tools appreciated by one of ordinary skill in the art, even if not described in the present disclosure, may also be used.

The number of dielectric crystal grains G per unit thickness (1 μm) of the dielectric layer 111 means the number of dielectric crystal grains G disposed per 1 μm thickness of the dielectric layer. That is, the number of dielectric crystal grains G per unit thickness (1 μm) of the dielectric layer 111 may mean a value obtained by dividing 1 μm by an average grain size of the dielectric crystal grains G. Accordingly, the average grain size of the dielectric crystal grains G according to the present disclosure may be 166 nm or less. In a case where the average grain size of the dielectric crystal grains G is 166 nm or less, the number of dielectric crystal grains per unit thickness (1 μm) of the dielectric layer 111 may be 6 or more.

When straight lines are drawn from one points of a grain boundary of a dielectric crystal grain to other points, a line having the largest value is a major axis, and a line having the largest value among straight lines orthogonal to the major axis is a minor axis, the grain size of the dielectric grain G may be an average value of the major axis and the minor axis. A value obtained by averaging the grain sizes of 500 or more dielectric crystal grains may be the average grain size of the dielectric crystal grains.

The grain size of the dielectric crystal grain (G) may be measured from an image obtained by scanning a central portion of the cross section of the body 110 in the length and thickness directions (L-T) with the SEM. In this case, a magnification may be changed according to the thickness of the dielectric layer and the grain size of the dielectric crystal grain, and the magnification may be adjusted so as to be able to measure the grain sizes of 500 or more dielectric crystal grains. However, it is not necessary to perform the measurement by adjusting the magnification so that 500 or more dielectric crystal grains are included in one image, and the measurement may be performed using a plurality of images by adjusting the magnification so that the total number of dielectric crystal grains included in the plurality of images is 500 or more. For an average grain size of the dielectric crystal grains, other measurement methods and/or tools appreciated by one of ordinary skill in the art, even if not described in the present disclosure, may also be used.

A size of the ceramic electronic component 100 need not be particularly limited.

However, according to an exemplary embodiment in the present disclosure, the body 110 may include the dielectric layers and the internal electrodes alternately disposed in the first direction, and have the first and second surfaces opposing each other in the first direction, the third and fourth surfaces connected to the first and second surfaces and opposing each other in the second direction, and the fifth and sixth surfaces connected to the first to fourth surfaces and opposing each other in the third direction. The external electrodes may be disposed on the third and fourth surfaces, respectively, a maximum size of the ceramic electronic component in the second direction may be 1.8 mm or more, and a maximum size of the ceramic electronic component in the third direction may be 1.08 mm or more.

According to the present disclosure, high capacitance may be achieved while maintaining high reliability, and in the ceramic electronic component 100 having a size of 2012 (length of 2.0 mm×width of 1.2 mm) or more at which such high reliability may be implemented in general, an effect of improving reliability and increasing the capacitance per unit volume according to the present disclosure may become more significant. Specifically, in a ceramic electronic component having a general size of 2012 (length of 2.0 mm×width of 1.2 mm) or more according to the related art in which the number of dielectric crystal grains per unit thickness of the dielectric layer and the dielectric layer are not controlled, a value obtained by multiplying the capacitance per unit volume by the rated voltage is difficult to be 100 $\mu F \cdot V/mm^3$ or more. However, in a case where the average thickness of the dielectric layer 111 is decreased to 2.0 μm or less, and the number of dielectric crystal grains per unit thickness (1 μm) of the dielectric layer 111 is controlled to 6 or more according to the present disclosure, even in the ceramic electronic component 100 having a size of 2012 (length of 2.0 mm×width of 1.2 mm) or more, the value obtained by multiplying the capacitance per unit volume by the rated voltage may be 100 $\mu F \cdot V/mm^3$ or more, and high reliability may be secured. Here, the rated voltage may mean a voltage at which the ceramic electronic component may be operated for 1000 hours or more without deterioration in reliability.

Considering a manufacturing error, sizes of the external electrodes, and the like, in case where the ceramic electronic component 100 has a length of 1.80 mm or more and a width of 1.08 mm or more, the effect of improving reliability and increasing the capacitance per unit volume according to the present disclosure may become more significant. Here, the length of the ceramic electronic component 100 may refer to the maximum size of the ceramic electronic component 100 in the second direction, and the width of the ceramic electronic component 100 may refer to the maximum size of the multilayer electronic component 100 in the third direction.

In an exemplary embodiment, td/te≤3.0, te being an average thickness of each of the internal electrodes 121 and 122. In a case where td/te exceeds 3.0, the capacitance per unit volume may decrease or the reliability may deteriorate.

A lower limit of td/te does not need to be particularly limited, but in order to secure high reliability, td/te may exceed 1.

Therefore, it is preferable that td/te≤3.0, and it may be more preferable that 1<td/te≤3.0 in terms of securing high reliability.

In an exemplary embodiment, the average thickness te of each of the internal electrodes 121 and 122 does not need to be particularly limited. For example, the average thickness te of each of the internal electrodes 121 and 122 may be 0.6 μm or more and less than 2.0 μm.

The average thickness te of each of the internal electrodes 121 and 122 may be measured from an image obtained by scanning the cross section of the body 110 in the length and thickness directions (L-T) with the SEM of 10,000 magnifications. More specifically, an average value may be obtained by measuring thicknesses of one internal electrode at 30 points positioned at equal intervals in the length direction in the obtained image. The 30 points positioned at equal intervals may be designated in the capacitance forming portion Ac. In addition, when an average thickness of a plurality of internal electrodes (e.g., 10 internal electrodes) is measured, the average thickness of the internal electrode layer may be further generalized. Other measurement methods and/or tools appreciated by one of ordinary skill in the art, even if not described in the present disclosure, may also be used.

In an exemplary embodiment, in the ceramic electronic component 100, a value obtained by multiplying the capacitance per unit volume by the rated voltage may be 100 $\mu F \cdot V/mm^3$ or more. In a case where the average thickness of the dielectric layer 111 is decreased to 2.0 μm or less, and the number of dielectric crystal grains per unit thickness (1 μm) of the dielectric layer 111 is controlled to 6 or more according to the present disclosure, the value obtained by multiplying the capacitance per unit volume by the rated voltage may be 100 $\mu F \cdot V/mm^3$ or more, and high reliability may be secured.

In an exemplary embodiment, in a cumulative distribution of grain sizes of the plurality of dielectric crystal grains, 2≤D99/D50≤3 and 2≤D50/D1≤3 in which D1 is a value of 1%, D50 is a value of 50%, and D99 is a value of 99%. By adjusting the grain size of dielectric grain to satisfy the relationships, 2≤D99/D50≤3 and 2≤D50/D1≤3, a decrease in dielectric constant may be prevented to implement high capacitance and a roughness of the dielectric layer may be reduced to improve a withstand voltage characteristic.

In a case where the values of D99/D50 and D50/D1 are less than 2, problems such as a delamination defect and difficulty in capacitance implementation may occur, and in a case where the values of D99/D50 and D50/D1 exceed 3, the roughness of the dielectric layer may be increased, which leads to deterioration in withstand voltage characteristic.

In an exemplary embodiment, the dielectric layer 111 may be formed using a plurality of dielectric powder grains, and in a cumulative distribution of grain sizes of the plurality of dielectric powder grains, 2<D90a/D50a<3 and 2<D50a/D10a<3 in which D10a is a value of 10%, D50a is a value of 50%, and D90a is a value of 90%.

In a case where the values of D90a/D50a and D50a/D10a are 2 or less or 3 or more, it may be difficult to uniformly secure the grain size of the dielectric crystal grain because the grain size distribution is non-uniform.

The body 110 may include the capacitance forming portion Ac disposed in the body 110 and including the first internal electrode 121 and the second internal electrode 122 disposed to face each other with each of the dielectric layers 111 interposed therebetween to form the capacitance and cover portions 112 and 113 formed on upper and lower surfaces of the capacitance forming portion Ac in the first direction, respectively.

In addition, the capacitance forming portion Ac, which contributes to forming the capacitance of the capacitor, may be formed by repeatedly stacking a plurality of first and second internal electrodes 121 and 122 with each of the dielectric layers 111 interposed therebetween.

The cover portions 112 and 113 may include an upper cover portion 112 disposed on the upper surface of the capacitance forming portion Ac in the first direction and a lower cover portion 113 disposed on the lower surface of the capacitance forming portion Ac in the first direction.

The upper cover portion 112 and the lower cover portion 113 may be formed by stacking a single dielectric layer or two or more dielectric layers on the upper and lower surfaces of the capacitance forming portion Ac, respectively, in the thickness direction, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate ($BaTiO_3$)-based ceramic material.

Meanwhile, a thickness of each of the cover portions 112 and 113 does not need to be particularly limited. However, in the ceramic electronic component having a size of 2012 (length×width, 2.0 mm×1.2 mm) or more, in general, a thickness tc of each of the cover portions 112 and 113 may be 200 μm or more.

The average thickness tc of each of the cover portions 112 and 113 may refer to a size of each of the cover portions 112 and 113 in the first direction, may be an average value of sizes of the cover portion 112 or 113 in the first direction measured at five points positioned at equal intervals on the upper surface or the lower surface of the capacitance forming portion Ac.

In addition, margin portions 114 and 115 may be disposed on side surfaces of the capacitance forming portion Ac.

The margin portions 114 and 115 may include the first margin portion 114 disposed at the fifth surface 5 of the body 110 and the second margin portion 115 disposed at the sixth surface 6. That is, the margin portions 114 and 115 may be disposed at opposite end surfaces of the body 110 in the width direction, respectively.

The margin portions 114 and 115 may refer to regions between opposite ends of the first and second internal electrodes 121 and 122 and boundary surfaces of the body 110 in a cross section of the body 110 in the width and thickness (W-T) directions, as illustrated in FIG. 3.

The margin portions 114 and 115 may basically serve to prevent damage to the internal electrodes due to physical or chemical stress.

The margin portions 114 and 115 may be formed by applying a conductive paste onto ceramic green sheets except for places where the margin portions are to be formed to form the internal electrodes.

Alternatively, in order to suppress a step due to the internal electrodes 121 and 122, the margin portions 114 and 115 may be formed by stacking the internal electrodes, cutting the stacked internal electrodes so that the internal electrodes are exposed to the fifth and sixth surfaces 5 and 6 of the body, and then stacking a single dielectric layer or two or more dielectric layers on opposite side surfaces of the capacitance forming portion Ac in the third direction (width direction).

Meanwhile, a width of each of the margin portions 114 and 115 does not need to be particularly limited. However, in the ceramic electronic component having a size of 2012 (length×width, 2.0 mm×1.2 mm) or more, in general, an average thickness of each of the margin portions 114 and 115 may be 200 μm or more.

The average widths of the margin portions 114 and 115 may refer to an average size MW1 of a region in which the internal electrodes are spaced apart from the fifth surface in the third direction and an average size MW2 of a region in which the internal electrodes are spaced apart from the sixth surface in the third direction, and may be values obtained by averaging the sizes of the margin portions 114 and 115 in the third direction measured at five points positioned at equal intervals on the side surfaces of the capacitance forming portion Ac.

The internal electrodes 121 and 122 may include the first and second internal electrodes 121 and 122. The first and second internal electrodes 121 and 122 may be alternately disposed to face each other with each of the dielectric layers 111 included in the body 110 interposed therebetween, and may be exposed to the third and fourth surfaces 3 and 4 of the body 110, respectively.

Referring to FIG. 3, the first internal electrodes 121 may be spaced apart from the fourth surface 4 and be exposed through the third surface 3, and the second internal electrodes 122 may be spaced apart from the third surface 3 and be exposed through the fourth surface 4. The first external electrode 131 may be disposed on the third surface 3 of the body and be connected to the first internal electrodes 121, and the second external electrode 132 may be disposed on the fourth surface 4 of the body and be connected to the second internal electrodes 122.

That is, the first internal electrodes 121 are not connected to the second external electrode 132, and may be connected to the first external electrode 131, and the second internal electrodes 122 are not connected to the first external electrode 131, and may be connected to the second external electrode 132. Therefore, the first internal electrodes 121 may be spaced apart from the fourth surface 4 by a predetermined distance, and the second internal electrodes 122 may be spaced apart from the third surface 3 by a predetermined distance. In addition, the first and second internal electrodes 121 and 122 may be disposed to be spaced apart from the fifth and sixth surfaces of the body 110.

In this case, the first and second internal electrodes 121 and 122 may be electrically separated from each other by each of the dielectric layers 111 disposed therebetween.

The body 110 may be formed by alternately stacking a ceramic green sheet on which the first internal electrode 121 is printed and a ceramic green sheet on which the second internal electrode 122 is printed and then sintering the stacked ceramic green sheets.

A material of each of the internal electrodes 121 and 122 is not particularly limited, and may be a material having excellent electrical conductivity. For example, the internal electrodes 121 and 122 may contain one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for an internal electrode containing one or more of nickel (Ni), copper (Cu), palladium (Pd), silver (Ag), gold (Au), platinum (Pt), tin (Sn), tungsten (W), titanium (Ti), and alloys thereof on a ceramic green sheet. A method of printing the conductive paste for an internal electrode may be a screen printing method, a gravure printing method, or the like, but is not limited thereto.

An average size ML2 of a region in which the first internal electrodes 121 are spaced apart from the fourth surface of the body 110 in the second direction and an average size ML1 of a region in which the second internal electrodes 122 are spaced apart from the third surface of the body 110 in the second direction do not need to be particularly limited. However, in the ceramic electronic component having a size of 2012 (length of 2.0 mm×width of 1.2 mm) or more, ML1 and ML2 may be generally 200 μm or more.

In a cross section of the center of the body 110 in the third direction taken along the first and second directions, ML1 may be a value obtained by averaging sizes of a region in which arbitrary five second internal electrodes 122 positioned at the center in the first direction are spaced apart from the third surface, in the second direction, and ML2 may be a value obtained by averaging sizes of a region in which arbitrary five first internal electrodes 121 positioned at the center in the first direction are spaced apart from the fourth surface, in the second direction.

Furthermore, ML1 and ML2 may be obtained in the cross section (L-T cross section) of the body 110 taken along the first and second directions at five points positioned at equal intervals in the third direction, and values obtained by averaging thereof may be used as ML1 and ML2 for further generalization.

The external electrodes 131 and 132 may be disposed on the third surface 3 and the fourth surface 4 of the body 110, respectively.

The external electrodes 131 and 132 may include the first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover opposite end surfaces of the side margin portions 114 and 115 in the second direction, respectively.

A structure in which the ceramic electronic component 100 includes two external electrodes 131 and 132 has been described in the present exemplary embodiment, but the number, shapes or the like, of external electrodes 131 and 132 may be changed depending on shapes of the internal electrodes 121 and 122 or other purposes.

Meanwhile, the external electrodes 131 and 132 may be formed of any material having electrical conductivity, such as a metal, a specific material of each of the external electrodes 131 and 132 may be determined in consideration of an electrical characteristic, structural stability, and the like, and the external electrodes 131 and 132 may have a multilayer structure.

For example, the external electrode 131 may include electrode layers 131a and 131b disposed on the body 110, and a plating layer 131c formed on the electrode layers 131a and 131b, and the external electrode 132 may include electrode layers 132a and 132b disposed on the body 110, and a plating layer 132c formed on the electrode layers 132a and 132b.

More specific examples of the electrode layers 131a, 132a, 131b, and 132b may include fired electrodes containing a conductive metal and glass or resin-based electrodes containing a conductive metal or a resin.

In addition, the electrode layers 131a, 132a, 131b, and 132b may be formed in a manner of transferring a sheet containing a conductive metal onto the body or be formed in a manner of transferring a sheet containing a conductive metal onto a fired electrode.

The conductive metal contained in the electrode layers 131a, 132a, 131b, and 132b may be a material having excellent electrical conductivity, but is not particularly limited thereto. For example, the conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof.

In an exemplary embodiment, the electrode layers 131a, 132a, 131b, and 132b may have a two-layer structure including the first electrode layers 131a and 132a and the second electrode layers 131b and 132b, and accordingly, the external electrode 131 may include the first electrode layer 131a containing a conductive metal and glass, and the second electrode layer 131b disposed on the first electrode layer and containing a conductive metal and a resin, and the external electrode 132 may include the first electrode layer 132a containing a conductive metal and glass, and the second electrode layer 132b disposed on the first electrode layer and containing a conductive metal and a resin.

The first electrode layers 131a and 132a may contain glass and thus serve to improve a bonding strength with respect to the body, and the second electrode layers 131b and 132b may contain a resin and thus serve to improve a warpage strength.

The conductive metal used for the electrode layers 131a and 132a is not particularly limited as long as it is any material that may be electrically connected to the internal electrodes in order to form capacitance, and may include, for example, one or more selected from the group consisting of nickel (Ni), copper (Cu), palladium (Pd), silver (Ag), gold (Au), platinum (Pt), tin (Sn), tungsten (W), titanium (Ti), and alloys thereof. The first electrode layers 131a and 132a may be formed by applying and then firing a conductive paste prepared by adding glass frit to conductive metal powder.

The conductive metal contained in the second electrode layers 131b and 132b may serve to enable electrical connection to the first electrode layers 131a and 132a.

The conductive metal used for the second electrode layers 131b and 132b is not particularly limited as long as it is any material that may be electrically connected to the electrode layers 131a and 132a, and may include one or more selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal contained in the second electrode layers 131b and 132b may include one or more of spherical powder and flake-shaped powder. That is, the conductive metal may include only the flake-shaped powder, may include only the spherical powder, or may have a form in which the flake-shaped powder and the spherical powder are mixed with each other. Here, the spherical powder may have a form that is not completely spherical, for example, a form in which a length ratio (major axis/minor axis) of a major axis to a minor axis is 1.45 or less. The flake-shaped powder refers to powder having a flat and elongated shape, and is not particularly limited, and, for example, a length ratio (major axis/minor axis) of a major axis to a minor axis may be 1.95 or more. Lengths of the major axes and the minor axes of the spherical powder and the flake-shape type powder may be measured from an image obtained by scanning a cross section (L-T cross section) of the ceramic electronic component in the first and third directions taken at the center of the ceramic electronic component in the third direction with an SEM.

The resin contained in the second electrode layers 131b and 132b may serve to secure a bonding property and absorb shocks. The resin contained in the second electrode layers 131b and 132b may have a bonding property and a shock absorbing property, may be any resin that may be mixed with conductive metal powder to form a paste, and may include, for example, an epoxy-based resin.

In addition, the second electrode layers 131b and 132b may contain a plurality of metal particles, an intermetallic compound, and a resin. As the intermetallic compound is contained, electrical connectivity with the first electrode layers 131a and 132a may be further improved. The intermetallic compound may serve to connect the plurality of metal particles to each other to improve electrical connectivity, and may further serve to surround the plurality of metal particles to connect the plurality of metal particles to each other.

In this case, the intermetallic compound may include a metal having a melting point lower than a hardening temperature of the resin. That is, since the intermetallic compound includes the metal having the melting point lower than the hardening temperature of the resin, the metal having the melting point lower than the hardening temperature of the resin may be melted during drying and curing, and may form the intermetallic compound with some of the metal particles to surround the metal particles. Here, the intermetallic compound may preferably include a low melting point metal of 300 É or less.

For example, the low melting point metal may include Sn having a melting point of 213 É to 220 É. Sn may be melted during drying and curing, and the molten Sn may wet metal particles having a high melting point, such as Ag, Ni, or Cu, by a capillary phenomenon and react with some of Ag, Ni or Cu metal particles to form an intermetallic compound such as $Ag_3Sn$, $Ni_3Sn_4$, $Cu_6Sn_5$, or $Cu_3Sn$. Ag, Ni, or Cu that has not participated in the reaction may remain in a form of metal particles.

Therefore, the plurality of metal particles may include one or more of Ag, Ni, and Cu particles, and the intermetallic compound may include one or more of $Ag_3Sn$, $Ni_3Sn_4$, $Cu_6Sn_5$, and $Cu_3Sn$.

The plating layers 131c and 132c may serve to improve mounting characteristics. A type of the plating layers 131c and 132c is not particularly limited. That is, each of the plating layers 131c and 132c may be a plating layer containing one or more of Ni, Sn, Pd, and alloys thereof, and may be formed as a plurality of layers.

More specific examples of the plating layers 131c and 132c may include Ni plating layers or Sn plating layers, may have a form in which Ni plating layers and Sn plating layers are sequentially formed on the electrode layers 131a, 132a, 131b, and 132b, respectively, or may have a form in which Sn plating layers, Ni plating layers, and Sn plating layers are sequentially formed. Alternatively, the plating layers 131c and 132c may include a plurality of Ni plating layers and/or a plurality of Sn plating layers.

Experimental Example

Sample chips having different average sizes of dielectric crystal grains, average thicknesses of dielectric layers, and average thicknesses of internal electrodes were prepared by controlling a grain size of dielectric powder, a thickness of a ceramic green sheet, and a coating thickness of a conductive paste for an internal electrode. Here, the number of stacked layers was adjusted so that the capacitance forming portion Ac has the same volume, a size of the sample chip was 2012 (length of 2.0 mm×width of 1.2 mm), and a thickness of the sample chip was 1.2 mm.

An average thickness td of the dielectric layer of each sample chip, an average thickness te of the internal electrodes, an average grain size of the dielectric crystal grains, the number of crystal grains per dielectric layer, the number of crystal grains per unit thickness (1 μm), td/te, capacitance per unit volume, and reliability were measured and evaluated, and are shown in Table 1 below.

The capacitance per unit volume was calculated by measuring capacitance of the sample chip of each test number using an LCR meter, and dividing the measured capacitance by the volume of the sample chip of 2.88 $mm^3$. In addition, all the sample chips had the same rated voltage of 50 V, and a value obtained by multiplying the capacitance per unit volume of the sample chip of each test number by the rated voltage is shown in Table 1 below.

The reliability was evaluated by a highly accelerated life time (HALT) test. 40 sample chips were prepared for each test number, a voltage of 75V was applied at 150° C. for 48 hours, and then a sample chip whose insulation resistance was lowered to 1/10 or less of an initial value was determined as defective. The number of chips determined to be defective out of 40 sample chips was recorded, and in a case where the number of chips determined to be defective was 0, the reliability was classified as OK, and in a case where the number of chips determined to be defective was more than 1, the reliability was classified as NG.

TABLE 1

| Test No. | td (μm) | te (μm) | Average grain size (μm) | Number of crystal grains per dielectric layer (ea) | Number of crystal grains per unit thickness (ea/μm) | td/te | Capacitance per unit volume × Rated voltage (μF · V/$mm^3$) | Reliability |
| --- | --- | --- | --- | --- | --- | --- | --- | --- |
| 1 | 2 | 1 | 165 | 12.12 | 6.06 | 2 | 102 | OK (0/40) |
| 2 | 1.9 | 1 | 175 | 10.86 | 5.71 | 1.9 | 120 | NG (5/40) |
| 3 | 1.8 | 0.9 | 140 | 12.86 | 7.14 | 2 | 110 | OK (0/40) |
| 4 | 2.5 | 1 | 145 | 17.24 | 6.9 | 2.5 | 90 | OK (0/40) |
| 5 | 2.2 | 0.8 | 220 | 10 | 4.55 | 2.75 | 105 | NG (2/40) |
| 6 | 1.5 | 1 | 155 | 9.68 | 6.45 | 1.5 | 135 | OK (0/40) |
| 7 | 1.6 | 1 | 168 | 9.52 | 5.95 | 1.6 | 150 | NG (8/40) |
| 8 | 1 | 0.9 | 120 | 8.3 | 8.33 | 1.11 | 140 | OK (0/40) |

In Test Nos. 1, 3, 6 and 8, the average thickness of the dielectric layer was 2.0 μm or less, and the number of crystal grains per unit thickness was 6 or more. It may be appreciated that the value obtained by multiplying the capacitance per unit volume by the rated voltage was 100 μF·V/$mm^3$ or more, and the reliability was also excellent.

On the other hand, in Test Nos. 2, 4, 5, and 7 in which the average thickness of the dielectric layer exceeds 2.0 μm, or the number of crystal grains per unit thickness was less than 6, it may be appreciated that the value obtained by multiplying the capacitance per unit volume by the rated voltage was less than 100 μF·V/$mm^3$, or the reliability was not secured.

In Test Nos. 4 and 5 in which the average thickness of the dielectric layer exceeds 2.0 μm, the value obtained by multiplying the capacitance per unit volume by the rated voltage was less than 100 μF·V/$mm^3$, or the reliability was not secured.

In addition, in Test Nos. 2 and 7 in which the number of crystal grains per unit thickness was less than 6, the reliability was not secured even when the average thickness of the dielectric layer was 2.0 μm.

Therefore, it may be confirmed that both the condition that the average thickness of the dielectric layer is 2.0 μm or less and the condition that the number of crystal grains per unit thickness is 6 or more need to be satisfied in order to secure a high value obtained by multiplying the capacitance per unit volume by the rated voltage and secure reliability.

As set forth above, according to the exemplary embodiment in the present disclosure, the average thickness of the dielectric layer and the number of dielectric crystal grains per unit thickness (1 μm) of the dielectric layer are controlled, thereby improving reliability of the ceramic electronic component.

The average thickness of the dielectric layer and the number of dielectric crystal grains per unit thickness (1 μm) of the dielectric layer are controlled, thereby increasing capacitance per unit volume of the ceramic electronic component.

While exemplary embodiments have been shown and described above, it will be apparent to those skilled in the art that modifications and variations could be made without departing from the scope of the present disclosure as defined by the appended claims.

What is claimed is:

1. A ceramic electronic component comprising:
    a body including dielectric layers and internal electrodes; and
    external electrodes disposed on the body and connected to the internal electrodes,
        wherein the dielectric layers include a plurality of dielectric crystal grains, an average number of dielectric crystal grains per unit thickness (1 μm) across a thickness of an entirety of at least one the dielectric layers is 6 or more, and td is 2.0 μm or less, td being an average thickness of at least one of the dielectric layers,
        wherein $1 < td/te \leq 3.0$, te being an average thickness of at least one of the internal electrodes, and $te \geq 1$ μm.

2. The ceramic electronic component of claim 1, wherein the body includes the dielectric layers and the internal electrodes alternately disposed in a first direction, and has first and second surfaces opposing each other in the first direction, third and fourth surfaces connected to the first and second surfaces and opposing each other in a second direction, and fifth and sixth surfaces connected to the first to fourth surfaces and opposing each other in a third direction,
    the external electrodes are disposed on the third and fourth surfaces, respectively,
    a maximum size of the ceramic electronic component in the second direction is 1.80 mm or more, and
    a maximum size of the ceramic electronic component in the third direction is 1.08 mm or more.

3. The ceramic electronic component of claim 2, wherein each of the external electrodes includes a first electrode layer disposed on the body and containing a conductive metal and glass, and a second electrode layer disposed on the first electrode layer and containing a conductive metal and a resin.

4. The ceramic electronic component of claim 3, wherein a value obtained by multiplying a capacitance per unit volume by a rated voltage is 100 μF·V/mm³ or more.

5. The ceramic electronic component of claim 1, wherein an average grain size of the dielectric crystal grains is 166 nm or less.

6. The ceramic electronic component of claim 1, wherein each of the external electrodes includes a first electrode layer disposed on the body and containing a conductive metal and glass, and a second electrode layer disposed on the first electrode layer and containing a conductive metal and a resin.

7. The ceramic electronic component of claim 1, wherein in a cumulative distribution of grain sizes of the plurality of dielectric crystal grains, $2 \leq D99/D50 \leq 3$ and $2 \leq D50/D1 \leq 3$ in which D1 is a value of 1%, D50 is a value of 50%, and D99 is a value of 99%.

8. The ceramic electronic component of claim 1, wherein the dielectric layer is formed using a plurality of dielectric powder grains, and
    in a cumulative distribution of grain sizes of the plurality of dielectric powder grains, $2 < D90a/D50a < 3$ and $2 < D50a/D10a < 3$ in which D10a is a value of 10%, D50a is a value of 50%, and D90a is a value of 90%.

9. The ceramic electronic component of claim 1, wherein the body includes the dielectric layers and the internal electrodes alternately disposed in a first direction, and has first and second surfaces opposing each other in the first direction, third and fourth surfaces connected to the first and second surfaces and opposing each other in a second direction, and fifth and sixth surfaces connected to the first to fourth surfaces and opposing each other in a third direction,
    the external electrodes are disposed on the third and fourth surfaces, respectively,
    a maximum size of the ceramic electronic component in the second direction is 1.80 mm or more, and
    a maximum size of the ceramic electronic component in the third direction is 1.08 mm or more.

10. The ceramic electronic component of claim 1, wherein the body includes the dielectric layers and the internal electrodes alternately disposed in a first direction, and has first and second surfaces opposing each other in the first direction, third and fourth surfaces connected to the first and second surfaces and opposing each other in a second direction, and fifth and sixth surfaces connected to the first to fourth surfaces and opposing each other in a third direction,
    the internal electrodes include first internal electrodes spaced apart from the fourth, fifth, and sixth surfaces and connected to the third surface, and second internal electrodes spaced apart from the third, fifth, and sixth surfaces and connected to the fourth surface, and
    the external electrodes include a first external electrode disposed on the third surface and connected to the first internal electrodes, and a second external electrode disposed on the fourth surface and connected to the second internal electrodes.

11. A ceramic electronic component comprising:
    a body including dielectric layers and internal electrodes; and
    external electrodes disposed on the body and connected to the internal electrodes,
        wherein the dielectric layers include a plurality of dielectric crystal grains, an average grain size of the plurality of dielectric crystal grains is 166 nm or less, and td is 2.0 μm or less, td being an average thickness of at least one of the dielectric layers, and
        wherein in a cumulative distribution of grain sizes of the plurality of dielectric crystal grains, $2 \leq D99/D50 \leq 3$ and $2 \leq D50/D1 \leq 3$ in which D1 is a value of 1%, D50 is a value of 50%, and D99 is a value of 99%.

12. The ceramic electronic component of claim 11, wherein $td/te \leq 3.0$, te being an average thickness of at least one of the internal electrodes.

13. The ceramic electronic component of claim 12, wherein the body includes the dielectric layers and the internal electrodes alternately disposed in a first direction, and has first and second surfaces opposing each other in the first direction, third and fourth surfaces connected to the first and second surfaces and opposing each other in a second direction, and fifth and sixth surfaces connected to the first to fourth surfaces and opposing each other in a third direction, the external electrodes are disposed on the third and fourth surfaces, respectively, a maximum size of the ceramic electronic component in the second direction is 1.80 mm or more, and a maximum size of the ceramic electronic component in the third direction is 1.08 mm or more.

14. The ceramic electronic component of claim 13, wherein a value obtained by multiplying a capacitance per unit volume by a rated voltage is 100 $\mu F \cdot V/mm^3$ or more.

15. The ceramic electronic component of claim 14, wherein $1.0 < td/te \leq 3.0$.

16. The ceramic electronic component of claim 11, wherein each of the external electrodes includes a first electrode layer disposed on the body and containing a conductive metal and glass, and a second electrode layer disposed on the first electrode layer and containing a conductive metal and a resin.

* * * * *